United States Patent [19]

Khan

[11] 4,381,384

[45] Apr. 26, 1983

[54] CONTINUOUS POLYMERIZATION PROCESS

[75] Inventor: Ausat A. Khan, Newark, Del.

[73] Assignee: E. I. Du Pont de Nemours and Company, Wilmington, Del.

[21] Appl. No.: 293,333

[22] Filed: Aug. 17, 1981

[51] Int. Cl.$^3$ .......................... C08F 2/00; C08F 14/18
[52] U.S. Cl. ..................................... 526/206; 526/74; 526/247; 526/249; 526/253; 526/254; 526/255
[58] Field of Search ............... 526/206, 255, 247, 249, 526/253, 254, 74

[56] References Cited

U.S. PATENT DOCUMENTS

| | | | |
|---|---|---|---|
| 2,559,751 | 7/1951 | Berry et al. | 56/206 |
| 3,132,124 | 5/1964 | Conture et al. | 526/254 |
| 3,825,577 | 7/1974 | Lalu et al. | 260/435 |
| 4,025,709 | 7/1977 | Blaise et al. | 526/225 |

Primary Examiner—Harry Wong, Jr.

[57] ABSTRACT

A continuous process for polymerizing tetrafluoroethylene alone or with selected comonomers to prepare a polymer which employs a perfluoroalkyl ethane sulfonic acid or its salt or a perfluoroalkyl ethane sulfate salt as dispersing agent.

12 Claims, No Drawings

CONTINUOUS POLYMERIZATION PROCESS

BACKGROUND

The batch polymerization of tetrafluoroethylene (TFE) and of TFE with copolymerizable fluorinated ethylenically unsaturated comonomers in the presence of a dispersing agent is known. However, it is desirable to improve upon this polymerization by extending it to include continuous polymerization.

The tendency of polymer adhesions to form on reactor walls during polymerization of TFE when using ammonium perfluoroalkanoates, a common dispersing agent in TFE polymerization, has heretofore limited production rate and run life and has effectively precluded continuous operation.

SUMMARY OF THE INVENTION

It has now been discovered that if a selected perfluoroalkyl ethane sulfonic acid or its salt or a perfluoroalkyl ethane sulfate salt is employed as the dispersing agent, formation of adhesions on the reactor walls is reduced.

Specifically, this invention can be described as a continuous process for preparing tetrafluoroethylene homopolymer or copolymers of tetrafluoroethylene and at least one copolymerizable fluorinated ethylenically unsaturated comonomer which comprises feeding tetrafluoroethylene alone or with at least one said comonomer into an aqueous polymerization medium containing a free radical initiator and 0.5–3.0 percent by weight dispersing agent, based on weight of aqueous medium, in which the dispersing agent is (1) a mixture of compounds of the formula $$F\text{-}(CF_2\text{---}CF_2)_n\text{---}CH_2\text{---}CH_2\text{---}Y$$

wherein n is a cardinal number of 2–8 and the average value of n is between 3 and 6, or (2) a compound of said formula wherein n is a cardinal number selected from between 2–6; and Y is —SO$_3$M or —OSO$_3$M′ wherein M is a cation having a valence of 1 and M′ is an alkali metal cation or ammonium.

DESCRIPTION OF THE INVENTION

The F-(CF$_2$—CF$_2$)$_n$CH$_2$—CH$_2$—Y dispersing agent employed in the reaction is most readily available as a mixture of compounds in which n is a cardinal number of 2–8 with an average value of about 4. The average can be between 3–6 but 4 is most commonly available. The cation M employed in the functional group denoted as Y in the formula is preferably hydrogen, ammonium or an alkali metal, and most preferably is H$^+$, NH$_4^+$, Na$^+$, Li$^+$ or K$^+$. The cation M′ is preferably NH$_4^+$, Na$^+$, Li$^+$, or K$^+$. Preferably also Y is —OSO$_3$M′.

Representative copolymerizable fluorinated ethylenically unsaturated comonomers include those of the formulas

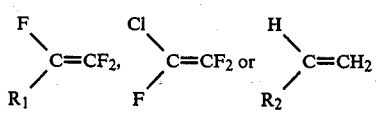

wherein R$_1$ is —R$_f$, —R$_f$X, —O—R$_f$, or —O—R$_f$X in which R$_f$ is a perfluoroalkyl radical of 1–12 carbon atoms, —R$_f$ is a linear perfluoroalkylene diradical of 1–12 carbon atoms in which the attaching valences are at each end of the linear chain, and X is H or Cl; and R$_2$ is R$_f$ or —R$_f$X. Representative comonomers include hexafluoropropylene, perfluorohexene-1, perfluorononene-1, perfluoro(methyl vinyl ether), perfluoro(n-propyl vinyl ether), perfluoro(n-heptyl vinyl ether), perfluoromethyl ethylene, perfluorobutyl ethylene, ω-hydroperfluoropentene-1, 3-hydroperfluoro(propyl vinyl ether), and the like, or mixtues thereof such as a mixture of hexafluoropropylene, and perfluoro(propyl vinyl ether).

The copolymerizable fluorinated ethylenically unsaturated comonomer is preferably selected from perfluoro(alkyl vinyl ethers) of the formula R$_f$—O—CF=CF$_2$; wherein R$_f$ is alkyl of 1–5 carbon atoms or perfluoro(terminally unsaturated olefins) of the formula R$_f$—CF=CF$_2$ wherein R$_f$ is alkyl of 1–5 carbon atoms; or perfluoroalkyl ethylenes of 3–7 carbon atoms of the formula, R$_f$—CH=CH$_2$ wherein R$_f$ is alkyl of 1–5 carbon atoms.

Comonomer content in the TFE copolymers can range from 0.005 mole percent up to about 20 mole percent, and more than one comonomer can be present. Thus the TFE copolymers comprise both melt-processible TFE copolymers and nonmelt-processible TFE copolymers. The comonomer content is low enough that the copolymers are plastics rather than elastomers, i.e., they are partially crystalline and after extrusion do not exhibit a rapid retraction to original length from a stretched condition of 2X at room temperature. For example, when a perfluorinated olefin is the comonomer, the content may preferably be 0.02–20 mole percent and when a perfluoroalkyl ethylene is the comonomer, the comonomer content preferably can be between 0.02–7 mole percent. When the comonomer is a perfluoro(alkyl vinyl ether) the comonomer content preferably can be between 0.02–2.3 mole percent. At the lower levels of these ranges the copolymer normally tends to be nonmelt-processible; while at the upper ranges the copolymer normally tends to be melt-processible.

The polymers are generally prepared by feeding tetrafluoroethylene or tetrafluoroethylene and comonomers into a pressure vessel which contains water, dispersing agent and a free radical polymerization initiator. By varying the amount of initiator, polymers of varying melt viscosity can be obtained. For example, to obtain polymers of high melt viscosity, the amount of initiator is decreased; and to obtain polymers of low melt viscosity, it is increased. Generally, a water solution containing initiator and dispersing agent is continuously pumped into the vessel, which is initially liquid-full with deoxygenated, distilled water at the desired reactor temperature. After a period of about one-quarter of the reactor residence time, monomers are pumped into the reactor at the desired rate. Agitator speed may be varied as desired, or agitator speed and pressure may be held constant and monomer feed can be varied to prepare a different composition copolymer. Temperatures between 50°–140° C. are ordinarily employed and pressures of 400–1000 psig (2.8–6.9 MPa) are ordinarily used. Initiators commonly employed are free radical initiators such as persulfates, for example ammonium or potassium persulfate, or disuccinic acid peroxide. The dispersing agent will be present in an amount between 0.5 and 3.0 percent based on weight of aqueous medium and preferably between 0.5–2.0 percent.

EXAMPLES AND COMPARISONS

In the Examples and Comparisons, HFP content in the copolymers prepared is determined by measurement of the ratio of the IR absorbance at 10.18 microns (982 cm.$^{-1}$) and the absorbance at 4.25 microns (2365 cm.$^{-1}$). This ratio is referred to as the HFP index. The mole percent HFP present is equal to 2.1 times the HFP index. Approximately 0.05 mm thick compression molded films were scanned under a nitrogen atmosphere.

Melt viscosity of the polymers prepared in the following Examples was measured according to American Society for Testing and Materials test D-1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C. Five minutes after the sample is charged to the cylinder it is extruded through a 2.10 mm (0.0825 inch) diameter, 8.00 mm (0.315 inch) long square-edge orifice under a load (piston plus weight) of 5000 grams. This corresponds to a shear stress of 44.8 kPa (6.5 pounds per square inch). The melt viscosity in poises is calculated as 53170 divided by the observed extrusion rate in grams per minute. All references to melt viscosity made hereinabove and hereinafter refer to melt viscosity measured at 372° C.

PPVE content was measured by infrared absorption (1340 cm$^{-1}$), as described in U.S. Pat. No. 4,029,868.

EXAMPLE 1

Continuous Polymerization of Tetrafluoroethylene (TFE) and Hexafluoropropylene (HFP)

A stirred, water-steam jacketed, stainless steel, heated autoclave, having an agitator shaft containing a series of blades along its axis and having a water capacity of 2.1 liters was charged with deoxygenated water to fill the autoclave and was heated to the desired polymerization temperature. Solution A and Solution B (defined below) were prepared together as one solution and pumped into the autoclave until reactor pressure reaches the desired value and pumping was continued for a period equal to ¼ the residence time. Gaseous TFE and HFP were then metered continuously through rotameters into a diaphragm compressor. The lines and compressor were previously flushed with monomers to displace nitrogen. The diaphragm compressor discharges gaseous monomers at desired pressure and temperature into the autoclave. The mixture of Solutions A and B was fed continuously at predetermined rates to the reactor through a line at the bottom of the reactor. The feed rates were not charged during the operation. The reaction mass, i.e., polymer dispersion and unreacted monomers, was removed continuously from the top of the reactor at the same rate as the fresh materials were pumped into the reactor. This removed mass was discharged through a backpressure regulator into a degasser where unreacted monomer separates from the polymer dispersion. The unreacted monomer was metered through a wet test meter and part of it fed to a gas chromatograph instrument to determine the composition of the off-gas for determining the conversion of monomers. The polymer was isolated by coagulation with methanol and a small quantity of trichlorotrifluoroethane (Freon ® 113). It was filtered, washed three times with 60° C. and dried in an air oven at 100° C. for 24 hours. Table 1 shows the recipes and results.

TABLE 1

| | Polymerization Recipe | | |
|---|---|---|---|
| | Dispersing Agent[2] | | |
| | $F(CF_2CF_2)_nCH_2CH_2OSO_3Li$ | $F(CF_2CF_2)_nCH_2CH_2OSO_3NH_4$ | $F(CF_2CF_2)_nCH_2CH_2OSO_3Na$ |
| Feed g/hr | | | |
| TFE | 215 g/hr | 215 g/hr | 215 g/hr |
| HFP | 215 g/hr | 150 g/hr | 135 g/hr |
| Solution A & B: | | | |
| $K_2S_2O_8$ | 0.385 g/hr | 0.385 g/hr | — |
| KTPP[1] | 0.6 g/hr | — | — |
| APS[3] | — | — | 0.3 g/hr |
| Water | 0.5 L/hr | 0.6 L/hr | 0.8 L/hr |
| $Na_2HPO_4 7H_2O$ | — | 0.6 g/hr | 0.6 g/hr |
| Dispersing Agent | 7. g/hr | 6. g/hr | 5.6 g/hr |
| Reactor Temp. | 95° C. | 95° C. | 95° C. |
| Pressure | 6.2 MPa | 6.2 MPa | 6.2 MPa |
| Production rate | 0.233 kg/hr | 0.21 kg/hr | 0.170 kg/hr |
| Duration of run | 41 hr | 21 hr | 60 hr |
| Composition | | | |
| TFE mole percent | 95 | 94.6 | 94.6 |
| HFP mole percent | 5 | 5.4 | 5.4 |
| MV × 10$^4$ at 372° C. | — | 15.3 | 23.4 |
| Remarks | Stable dispersion No fouling | Stable dispersion No fouling | Stable dispersion No fouling |

[1]KTPP = Potassium tripolyphosphate
[2]n = a cardinal number of 2-8. The agent is a mixture of these having an average n value of 4.
[3]APS = Ammonium Persulfate

COMPARATIVE EXPERIMENT 1

Continuous polymerization of TFE/HFP in the presence of ammonium perfluoro caprylate ($CF_3(CF_2)_6COONH_4$) as the dispersing agent was carried out according to the procedure described in Example 1, except that Solutions A and B were fed separately. The runs were aborted due to the pluggage of the letdown system and reactor.

| | Polymerization Recipe | | | |
|---|---|---|---|---|
| | | | Run | |
| | 1 | 2 | 3 | 4 |
| Monomer Feed | | | | |
| TFE | g/hr 350 | 350 | 350 | 350 |

| -continued | | | | | |
|---|---|---|---|---|---|
| Polymerization Recipe | | | | | |
| | | Run | | | |
| | | 1 | 2 | 3 | 4 |
| HFP | g/hr | 121 | 121 | 121 | 121 |
| Solution A | | | | | |
| APS* | g/hr | 3.23 | 3.23 | 1.62 | 1.625 |
| NaOH | g/hr | 0.08 | 0.08 | 0.08 | |
| Water | L/hr | 1.0 | 1.0 | 1.0 | 1.5 |
| Solution B | | | | | |
| $CF_3(CF_2)_6COONH_4$ | g/hr | 2.0 | 10.0 | 10.0 | 10.0 |
| Water | L/hr | 1.0 | 1.0 | 1.0 | 1.5 |
| Sodium Sulfite | g/hr | — | — | 0.21 | 0.9 |
| Reactor Temp. | °C. | 95 | 95 | 95 | 95 |
| Reactor Pressure | MPa | 4.1 | 4.1 | 4.1 | 4.1 |
| Remarks | | Plugged after 25 mins. | Plugged after 102 mins. | Plugged after 33 mins. | Plugged after 90 mins. |

*ammonium persulfate

EXAMPLE 2
EFFECT OF METHYLENE CHAIN LENGTH OF TFE/HFP POLYMER

A continuous polymerization of TFE/HFP was run according to the procedure described for Example 1 to demonstrate the effect of methylene chain length of the dispersing agent on the polymerization rate, molecular weight of polymer and colloidal stability of dispersion. The surfactant containing four methylene groups drastically reduced the rate of polymerization and the molecular weight and incorporation of HFP in the copolymer (which is evident from the melt viscosity and percent conversion of monomer).

| | | Run | |
|---|---|---|---|
| | | 1 | 2 |
| Monomer Feed | | | |
| TFE | g/hr | 336 | 336 |
| HFP | g/hr | 264 | 264 |
| Water Solution | | | |
| $F(CF_2CF_2)_n(CH_2)_2SO_3NH_4$[1] | g/hr | 6.0 | — |
| $F(CF_2CF_2)_n(CH_2)_4SO_3NH_4$[1] | g/hr | — | 6.0 |
| $Na_2HPO_4 7H_2O$ | g/hr | 0.45 | 0.45 |
| APS | g/hr | 0.55 | 0.55 |
| Water | l/hr | 1.2 | 1.2 |
| Reactor Temp. | °C. | 95 | 95 |
| Reactor Pressure | MPa | 6.2 | 6.2 |

| | | Run | |
|---|---|---|---|
| | | 1 | 2 |
| % Conversion | | 58.3 | 2.0 |
| MV at 372° C. | | $58 \times 10^4$ | Too low, cannot be measured |
| Melting Point | °C. | 277 | 305 |

[1]n = a cardinal number of 2-8. The composition is a mixture with an average n value of 4.

EXAMPLE 3

This example illustrates continuous copolymerization of TFE and perfluoro(propyl vinyl ether) (PPVE) according to the procedure of Example 1 using a 2.1 liter autoclave reactor with the exception that Solutions A and B are fed separately.

| Monomer Feed: | | |
|---|---|---|
| TFE | g/hr | 600 |
| Freon® 115* | g/hr | 400 |
| PPVE | g/hr | 19.2 |
| Freon® 113* | g/hr | 19.6 |
| Solution A | | |
| APS | g/hr | 1 |
| $Na_2HPO_4.7H_2O$ | g/hr | 0.83 |
| Water | L/hr | 2 |
| Solution B | | |
| $F(CF_2—CF_2)_n—CH_2—CH_2—OSO_3—NH_4$ (n = 2-8, ave 4) | g/hr | 16 |
| Water | L/hr | 2 |
| Reactor Temperature | °C. | 105 |
| Pressure | MPa | 6.2 |

*Freon® 115 = chloropentafluoroethane
Freon® 113 = trichlorotrifluoroethane

Operation was smooth and a stable dispersion was obtained. Percent conversion was 98% of the TFE and the melt viscosity in poises was $280 \times 10^4$. Percent PPVE present was 0.57 mole percent.

EXAMPLE 4

This example illustrates continuous homopolymerization of TFE according to the procedure of Example 3, except that a 3.8 liter reactor was used.

CONTINUOUS POLYMERIZATION OF TFE USING DISPERSING AGENT $F(CF_2CF_2)_nCH_2CH_2$ Y WHERE Y is $—SO_3NH_4$ OR $—OSO_3NH_4$ AND n=2-8 (a mixture, ave n=4)

| Monomer Feed | | | | |
|---|---|---|---|---|
| TFE | g/hr | 600 | 850 | 400 |
| Freon® 115* | g/hr | 400 | 570 | 200 |
| Solution A | | | | |
| $(NH_4)_2S_2O_8$ | g/hr | 1.0 | 1.25 | 0.75 |
| $Na_2HPO_4.7H_2O$ | g/hr | 0.83 | 1.16 | 0.83 |
| Water | L/hr | 2.0 | 3.0 | 1.0 |
| Solution B | | | | |
| Dispersing Agent | | Y = $—OSO_3NH_4$ | Y = $—OSO_3NH_4$ | Y = $—SO_3NH_4$ |
| Feed Rate | g/hr | 16.0 | 17.3 | 12.0 |
| Water | L/hr | 2 | 3 | 1 |
| Reactor Temp. | °C. | 105 | 95 | 95 |
| Pressure | MPa | 6.2 | 6.2 | 6.2 |
| Remarks | | Smooth run; No dust formation; stable latex | Stable Latex | Stable latex; 26 hrs duration |

| | | | |
|---|---|---|---|
| % Conversion of TFE | 98 | 98 | 95 |

*Freon® 115 = chloropentafluoroethane

I claim:

1. A continuous process for preparing tetrafluoroethylene homopolymer or copolymers of tetrafluoroethylene and at least one copolymerizable fluorinated ethylenically unsaturated comonomer which comprises feeding tetrafluoroethylene alone or with at least one said comonomer present in an amount sufficient to produce a comonomer unit content in the copolymer of between 0.005 mole percent and 20 mole percent, into an aqueous polymerization medium containing a free radical initiator and 0.5–3.0 percent dispersing agent, based on weight of aqueous medium, in which the dispersing agent is (1) a mixture of compounds of the formula $$F\text{+}CF_2\text{—}CF_nCH_2\text{—}CH_2\text{—}Y$$

wherein n is a cardinal number of 2–8 and the average value of n is between 3 and 6, or (2) a compound of said formula wherein n is a cardinal number selected from between 2–6; and Y is —SO$_3$M or —OSO$_3$M' wherein M is a cation having the valence of 1 and M' is an alkali metal cation or ammonium.

2. The process of claim 1 wherein the copolymerizable comonomer is a fluorinated ethylenically unsaturated comonomer of the formula

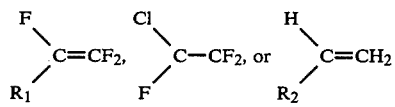

wherein R$_1$ is —R$_f$, —R$_f$X, —O—R$_f$ or —O—R$_f$X in which R$_f$ is a perfluoroalkyl radical of 1–12 carbon carbon atoms in which the attaching valences are at each end of the linear chain, and X is H or Cl; and R$_2$ is R$_f$ or —R$_f$X.

3. The process of claim 1 or 2 wherein Y is —OSO$_3$M'.

4. The process of claim 1 or 2 wherein Y is —SO$_3$M.

5. The process of claim 4 wherein M is H$^+$, NH$_4^+$, Na$^+$, Li$^+$ or K$^+$.

6. The process of claim 2 wherein the unsaturated comonomer has the formula

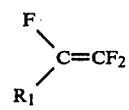

wherein R$_1$ is —OR$_f$.

7. The process of claim 2 wherein the unsaturated comonomer has the formula

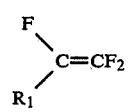

wherein R$_1$ is R$_f$.

8. The process of claim 2 wherein the comonomer has the formula

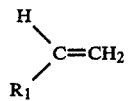

wherein R$_1$ is R$_f$.

9. The process of claim 1 or 2 wherein the comonomer is hexafluoropropylene.

10. The process of claim 1 or 2 wherein the comonomer is perfluoro(propyl vinyl ether).

11. The process of claim 1 or 2 wherein the comonomer is a mixture of hexafluoropropylene and perfluoro(propyl vinyl ether).

12. The process of claim 1 wherein the aqueous medium contains 0.5–2.0 percent by weight dispersing weight.